Oct. 23, 1951 S. H. STONER 2,572,072
VERTICALLY ADJUSTABLE SEAT FOR AIRCRAFT
Filed March 23, 1945
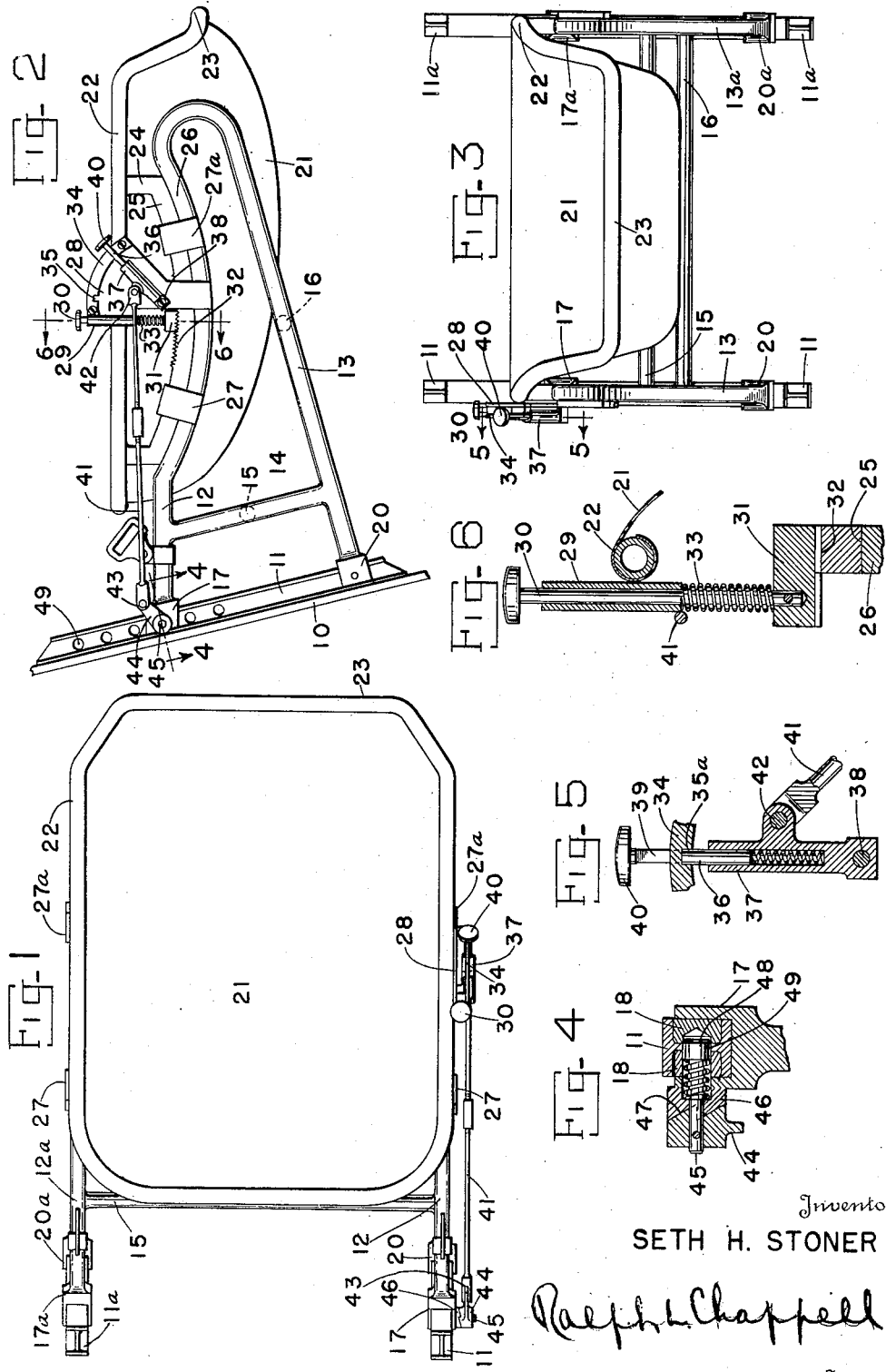
Inventor
SETH H. STONER
Ralph L. Chappell
Attorney Patented Oct. 23, 1951

2,572,072

UNITED STATES PATENT OFFICE 2,572,072

VERTICALLY ADJUSTABLE SEAT FOR AIRCRAFT

Seth H. Stoner, United States Navy

Application March 23, 1945, Serial No. 584,479

5 Claims. (Cl. 155—82)

(Granted under the act of March 3, 1883, as amended April 30, 1928; 370 O. G. 757)

The present invention relates to new and useful improvements in vehicle seats and more particularly to improvements in seats, such as pilot seats, for use in military and naval aircraft.

In general, the invention contemplates the provision of a frame structure secured to the armor plate or other structural part of the aircraft and a "pan-type" seat carried by the frame structure for tilting movement relative thereto. The frame structure may be shifted vertically for adjustment in addition to the aforementioned tilting adjustment of the seat.

An object of the present invention is to provide a seat assembly substantially of the above type wherein the seat portion is arranged to tilt about an axis disposed approximately at the hip joint of the pilot or other occupant whereby to permit tilting adjustment of the seat portion without disturbing the upper body position of the occupant.

A further object of the invention is to provide a seat assembly substantially of the above type, wherein the seat portion makes contact with the frame structure over an arcuate surface of substantial length whereby to provide ample and strong support for the occupant.

A still further object of the invention is to provide a seat assembly substantially of the above type wherein the center of a radius defining the arcuate contacting surfaces is disposed approximately at the hip joint of the occupant.

The above and other objects of the invention will in part be obvious and will be hereinafter more fully pointed out.

In the accompanying drawing:

Fig. 1 is a top plan view of the seat and frame assembly.

Fig. 2 is a side elevation showing the seat and frame assembly mounted in position.

Fig. 3 is a front view of Fig. 2.

Fig. 4 is an enlarged detail sectional view, taken along the line 4—4 of Fig. 2, showing the mechanism for locking the frame in vertically adjusted positions.

Fig. 5 is an enlarged detail sectional view taken along the line 5—5 of Fig. 3, showing the operating lever for the vertical locking mechanism.

Fig. 6 is an enlarged detail sectional view, taken along the line 6—6 of Fig. 2, showing the means for locking the seat in various tilted positions.

Referring more in detail to the accompanying drawing, the seat assembly is illustrated as being mounted on the armor plate 10 in rear of the pilot although it may be mounted on other structural parts of an aircraft. For this purpose, flanged H-shaped guide rails 11, 11a are suitably secured to the armor plate and are disposed vertically thereon in transversely spaced relationship.

The frame structure for directly supporting the seat includes a pair of identical side frame members each of which includes an upper horizontal leg portion 12, 12a and a lower and rearwardly inclined leg portion 13, 13a, respectively. The leg portions are strengthened by substantially vertical braces 14, and the frame members are maintained in horizontally spaced relationship by transverse braces 15, 16. The rear ends of the upper portions 12, 12a carry bracket members 17, 17a, respectively, which are provided with shoes 18 to engage between the flanges of the guide rails 11, 11a, respectively, as shown in Fig. 4. The lower leg portions 13, 13a are provided with similar rail engaging brackets 20, 20a, respectively, so that the frame structure can be shifted relative to the guide rails for purposes of vertical adjustment of the entire seat assembly.

The seat member 21 is illustrated as being of the "pan-type" which is secured around its periphery to a tubular bar 22 which is downwardly and forwardly offset, as at 23. The seat member is provided with depending supporting elements 24 at opposite sides thereof. The supporting elements are in the form of depending tubular frame members each having a relatively long arcuate bearing surface 25. Each bearing surface is downwardly convex along an arc defined by a radius swung approximately from the hip joint of a person occupying the seat. Each of the bearing members 25 makes surface contact throughout the length thereof with the leg portions 12, 12a which are shaped to provide similar supporting surfaces 26, also curved about the same axis or pivot point, namely, at the hip joint of the occupant. Guide brackets 27, 27a are secured to the leg portions 12, 12a and engage the bearing elements 25 to prevent transverse movement but permitting longitudinal movement relative to the said leg portions 12, 12a. Thus, the seat may be tilted by shifting the same along the curved supporting surfaces 26 for adjusting the leg and trunk position of the occupant without disturbing the upper body position of said occupant which may rest against a suitable back and head support.

A segment 28 is secured to the leg portion 12 in any suitable manner and extends upwardly to a position readily accessible to the occupant. The vertical edge of the segment is formed as a cylinder 29 within which a control rod or plunger 30 is disposed. A toothed block or rack 31 is carried by the lower end of the plunger rod and the teeth thereof are adapted to engage the teeth of a rack 32 on the upper surface of the bearing element 25. A coil spring 33 is disposed around the plunger and against the bottom edge of the cylindrical portion 29 so that the plunger rod 30 and rack member 31 are constantly forced downwardly to effect positive locking engagement between the interengaging teeth of the racks. Thus, the seat may be positively locked in any tilted position of adjustment. To alter this angular position of the seat, the occupant raises the plunger rod 30 to disengage the teeth on the rack members so that the seat may be shifted along the bearing surfaces 26, such movement being about a point substantially at the hip joint of the occupant.

The segment 28 is provided with an outwardly offset rail portion 34 having downwardly open recesses 35, 35a adapted to receive a plunger 36 which is carried by a control lever 37. The control lever 37 is pivotally mounted, as at 38, on the segment 28 and the rail portion 34 thereof passes through a slot 39 in the plunger which has a handle portion 40 adapted to be pressed downwardly to release the plunger, which acts as a latch, from one of the recesses. In the position of the lever in Figs. 2 and 5, the frame and seat assembly is located in a predetermined vertical position of adjustment by a locking mechanism which is operated by movement of the lever 37 and a link 41 pivotally connected thereto, as at 42. This locking mechanism will now be described, reference being had to Figs. 2 and 4 of the accompanying drawing. The opposite end of the link 41 is pivotally connected, as at 43, to an arm 44 which is secured to a stub shaft 45. The shaft 45 extends through a cam member 46 which is welded or otherwise suitably secured to the end of the leg portion 12. The hub of the arm 44 is provided with cam faces 47 cooperating with the adjacent faces of the cam member 46. The shaft 45 extends through the shoe 18 and terminates in a head 48 which is adapted to extend into one of the apertures 49 through the web of the flanged rail 11. A spring 50 disposed between the head 48 and the cam member 46 normally urges the head into one of the apertures 49 for locking engagement with the rail 11 in which position the frame and seat assembly is held in the desired position of adjustment relative to the rails 11, 11a. To release the head from the aperture into which it extends, the plunger 36 is depressed out of the recess 35a and the lever 37 is shifted rearwardly to effect counterclockwise movement of the arm 44. This movement of the arm and its hub will effect outward movement thereof and resultant retraction of the head 48 from the aperture by reason of the action of the cam member 46 on the cam faces 47. The seat and frame assembly may then be adjusted vertically relative to the rails. When the desired position has been reached, the lever 37 is shifted forward to the position of Fig. 2 and this will permit the spring pressed head 48 to be forced into the adjacent aperture in the rail web for locking the assembly.

From the foregoing description, it will be apparent that the invention provides an efficient pilot seat or other airplane seat assembly which is capable of vertical and pivotal or tilting adjustment. The tilting adjustment is effected in such a manner that the seat portion is tilted without disturbing the position of the upper body portion of the occupant by shifting the lower body portion substantially at the hip joint of the occupant.

While one form of the invention has been shown for purposes of illustration, it is to be clearly understood that various changes in details of construction and arrangement of parts may be made without departing from the scope of the invention as set forth in the appended claims.

The invention described herein may be manufactured and used by or for the Government of the United States of America for governmental purposes without the payment of any royalties thereon or therefor.

What I claim is:

1. A seat for aircraft comprising substantially vertical guide rails secured to the aircraft, a frame structure carried by said guide rails for sliding movement relative thereto, a seat member carried by said frame structure, means providing a locking connection between said frame structure and said guide rails for maintaining the frame structure in vertically adjusted position, and means readily accessible to the occupant for releasing said locking connection to permit vertical adjustment of the frame structure, said frame structure extending horizontally and comprised of spaced side members, said locking connection including a reciprocable bolt adapted to extend into apertures in one of the guide rails for locking the frame structure, and said releasing means including cam means for releasing the bolt and a lever on the frame structure connected by a link to said cam means, said lever being readily accessible to the occupant for operating said cam means.

2. A seat for aircraft comprising substantially vertical guide rails secured to the aircraft, a frame structure carried by said guide rails for sliding movement relative thereto, said frame structure extending horizontally and comprised of spaced side members, a seat member carried by said frame structure, means providing a locking connection between said frame structure and said guide rails for maintaining the frame structure in vertically adjusted position, and means readily accessible to the occupant for releasing said locking connection to permit vertical adjustment of the frame structure, said locking connection including a reciprocable bolt adapted to extend into apertures in one of the guide rails for locking the frame structure, spring means normally urging said bolt into locking position, said releasing means including cam means for releasing the bolt and a lever on the frame structure connected by a link to said cam means, said lever being readily accessible to the occupant for operating said cam means.

3. A seat for aircraft comprising substantially vertical guide rails secured to the aircraft, a frame structure carried by said guide rails for sliding movement relative thereto, said frame structure extending horizontally and comprised of bracket members slidable on said guide rails respectively and spaced horizontal side members extending from the bracket members respectively, a seat member carried by said frame structure, manually operable lever means pivotally connected to one of said side members, means mounted on said last named side member and cooperating with said lever means for maintaining said lever means in a preselected position, one of said vertical guide rails having a row of spaced apertures therein along the length thereof, one of said bracket members having a reciprocable spring pressed bolt adapted to extend into said apertures for locking the frame structure, rotatable cam means operatively connected to said bolt and constructed and arranged to selectively move the bolt to unlocking position and permit the bolt to move to locking position in accordance with the rotary setting of the cam means, and means including a link connecting said cam means to said lever means whereby the setting of the cam means may be adjusted by manually changing the position of the lever means.

4. A seat for aircraft comprising substantially vertical guide rails secured to the aircraft, a frame structure carried by said guide rails for sliding movement relative thereto, said frame structure extending horizontally and comprised of bracket members slidable on said guide rails respectively and spaced horizontal side members extending from the bracket members respectively, a seat member carried by said frame structure, a manually operable lever pivotally connected to one of said side members, said lever having a slot therein, a guide member mounted upon said last named side member and extending through said slot, said guide member and lever having means constructed and arranged to cooperate and maintain said lever in a preselected position, one of said vertical guide rails having a row of spaced apertures therein along the length thereof, one of said bracket members having a reciprocable spring pressed bolt adapted to extend into said apertures for locking the frame structure, rotatable cam means operatively connected to said bolt and constructed and arranged to selectively move the bolt to unlocking position and permit the bolt to move to locking position in accordance with the rotary setting of the cam means, and means including a link connecting said cam means to said lever means whereby the setting of the cam means may be adjusted by manually changing the position of the lever means.

5. A seat for aircraft comprising substantially vertical guide rails secured to the aircraft, a frame structure carried by said guide rails for sliding movement relative thereto, said frame structure extending horizontally and comprised of bracket members slidable on said guide rails respectively and spaced horizontal side members extending from the bracket members respectively, a seat member carried by said frame structure, manually operable lever means pivotally connected to one of said side members, said lever means including a pivoted casing, a spring disposed within said casing, a rod member having a handle and extending into said casing, said rod member having a slot therein, a guide member mounted upon said last named side member and extending through said slot, said guide member having a pair of spaced notches therein for selectively engaging the side of said rod adjacent said slot and maintaining said lever means in a preselected position, one of said vertical guide rails having a row of spaced apertures therein along the length thereof, one of said bracket members having a reciprocable spring pressed bolt adapted to extend into said apertures for locking the frame structure, rotatable cam means operatively connected to said bolt and constructed and arranged to selectively move the bolt to unlocking position and permit the bolt to move to locking position in accordance with the rotary setting of the cam means, and means including a link connecting said cam means to said lever means whereby the setting of the cam means may be adjusted by manually changing the position of the lever means.

SETH H. STONER.

REFERENCES CITED

The following references are of record in the file of this patent:

UNITED STATES PATENTS

| Number | Name | Date |
|---|---|---|
| 137,091 | Parker | Mar. 25, 1873 |
| 186,071 | White | Jan. 9, 1877 |
| 437,487 | Fischer et al. | Sept. 30, 1890 |
| 622,647 | Davis | Apr. 4, 1899 |
| 635,584 | Peregrine | Oct. 24, 1899 |
| 974,018 | Binckley | Oct. 25, 1910 |
| 1,176,667 | Else | Mar. 21, 1916 |
| 1,301,835 | Glenister | Apr. 29, 1919 |
| 1,522,406 | Bargen et al. | Jan. 6, 1925 |
| 2,043,287 | Dorton | June 9, 1936 |
| 2,097,618 | Drake | Nov. 2, 1937 |
| 2,271,925 | Niles | Feb. 3, 1942 |
| 2,313,023 | Ruegger | Mar. 2, 1943 |